United States Patent
Roh

(10) Patent No.: US 7,050,704 B1
(45) Date of Patent: May 23, 2006

(54) METHOD FOR STORING AND RETRIEVING DIGITAL DATA TO/FROM A TAPE RECORDING MEDIUM THROUGH A DIGITAL INTERFACE

(75) Inventor: Seung Phil Roh, Seoul (KR)

(73) Assignee: LG Electronics Inc., Seoul (KR)

( * ) Notice: Subject to any disclaimer, the term of this patent is extended or adjusted under 35 U.S.C. 154(b) by 782 days.

(21) Appl. No.: 09/628,501

(22) Filed: Jul. 28, 2000

(30) Foreign Application Priority Data

Jul. 29, 1999 (KR) .................................. 99-31167

(51) Int. Cl.
*H04N 5/76* (2006.01)
(52) U.S. Cl. ......................... 386/124; 386/40; 360/32
(58) Field of Classification Search ................. 386/1, 386/40, 46, 124; 360/32, 48, 40; H04N 5/76, H04N 5/781, 5/783
See application file for complete search history.

(56) References Cited

U.S. PATENT DOCUMENTS

| 4,789,961 A * | 12/1988 | Tindall | 360/72.1 |
| 4,839,745 A * | 6/1989 | Tindall | 386/113 |
| 6,301,588 B1 * | 10/2001 | Aoki | 707/200 |
| 6,397,277 B1 * | 5/2002 | Kato et al. | 710/104 |
| 6,523,696 B1 * | 2/2003 | Saito et al. | 709/223 |
| 2002/0181787 A1 * | 12/2002 | Ito et al. | 382/232 |
| 2003/0194200 A1 * | 10/2003 | Yuen et al. | 386/46 |

FOREIGN PATENT DOCUMENTS

KR 000024643 A 5/2000

\* cited by examiner

*Primary Examiner*—Thai Tran
(74) *Attorney, Agent, or Firm*—Fleshner & Kim, LLP

(57) ABSTRACT

A method for enabling a magnetic recording medium such as a digital video cassette tape of a digital video tape recorder to be used as an auxiliary storage device of a personal computer (PC) which communicates through a digital communication line is provided. A PC requests to record data, the digital video tape recorder searches for a recordable location of the tape, records data streams converted from the data of a file selected in the PC at the recordable location, and creates tape management information regarding the data streams recorded. A PC requests a file, the video tape recorder reproduces the tape management information recorded in the tape, identifies a recording location of the specified file based upon the reproduced tape management information, searches for the identified location in the tape, reproduces recorded data from the identified location, converts the reproduced data into transport streams, and transmits them to the PC.

12 Claims, 7 Drawing Sheets

*Conventional Art*

DVHS Tape Track

METHOD FOR STORING AND RETRIEVING DIGITAL DATA TO/FROM A TAPE RECORDING MEDIUM THROUGH A DIGITAL INTERFACE

BACKGROUND OF THE INVENTION

1. Field of the Invention

The present invention relates to a method for enabling a magnetic-tape recording medium such as a video cassette tape to be used as an auxiliary storage device.

2. Background of the Related Art

A recently developed tape recording medium, a digital video tape such as a DVHS tape is a mass storage device in which high-quality digital video and audio signals are recorded; therefore it is expected that the DVHS tape will become popular. Also, a digital video displaying apparatus capable of displaying high-quality video, a digital TV (called as 'D-TV' hereinafter), is able to display high-quality digital video provided from a digital satellite broadcast or a super-recording medium such as a DVD. Therefore, a D-TV will also become popular along with a DVHS-VCR which can record and reproduce digital data to/from the DVHS tape.

Accordingly, it is predicted that DVHS-VCR and D-TV will come into wide use and they will interact through a digital interface. The IEEE-1394 digital interface is recommended as a standard for digital connection. Details of the interface are found in IEEE standard 1394, the disclosure of which is incorporated by reference wherein.

FIG. 1 is simplified block diagrams of a DVHS-VCR and a D-TV which communicate through a digital interface such as the IEEE 1394. The DVHS-VCR comprises heads 11 for recording and reproducing digital video and audio data to/from a digital video tape; a recording/reproducing signal processor 12 for processing the video/audio data to record or processing the read video/audio data; an interface 14 for sending/receiving data to/from a personal computer (called as 'PC' hereinafter) which is connected through a digital interface such as IEEE 1394; and a controller 13 for controlling an overall operation for recording and reproducing data. The D-TV comprises an interface 21 for sending/receiving data to/from the DVHS-VCR connected through a digital interface such as IEEE 1394; a displayer 22 for decoding the received data and presenting video pictures; and a controller 23 for controlling an overall operation for the data presentation.

The data streams communicated between the DVHS-VCR and the D-TV have the transport stream (called as 'TS' hereinafter) format which is one of the MPEG formats. The TSs reproduced in the DVHS-VCR are transmitted to the D-TV through the digital interface and then processed to present video pictures in the D-TV. Similarly, the D-TV receives digital satellite broadcasting signals containing high-quality video pictures and then transmits them in the TS format to be recorded in an inserted DVHS tape by the DVHS-VCR.

However, the digital video tape cannot be used as an auxiliary storage device for storing moving picture data files or high-quality music data files such as MP3, which are stored in a memory of a PC, even though it is a mass storage device, since there is no specified data exchanging standard between the digital video tape recorder and the PC.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

It is an object of the present invention to provide a method for enabling a digital video tape to be used as an auxiliary storage device of a PC when a digital video tape recorder interacts with a PC through a digital communication line.

The present invention can be achieved in a whole or in parts by a method for storing digital data in a tape recording medium wherein the method comprises searching for a recordable location in a tape recording medium when a data store is requested from an external PC communicating through a digital interface; recording data streams, which have been converted from the data of a file which is selected in the PC, received through the digital interface in the discovered location; and creating management information regarding the data streams recorded.

The method for retrieving digital data from a tape recording medium according to the present invention comprises reproducing management information recorded in the tape recording medium when a retrieving request for a given file is received from an external PC communicating through a digital interface; identifying a recording location of the given file based upon the reproduced management information; searching for the identified location in the tape recording medium and reproducing recorded data from the identified location; and converting the reproduced data into transport streams and transmitting them.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
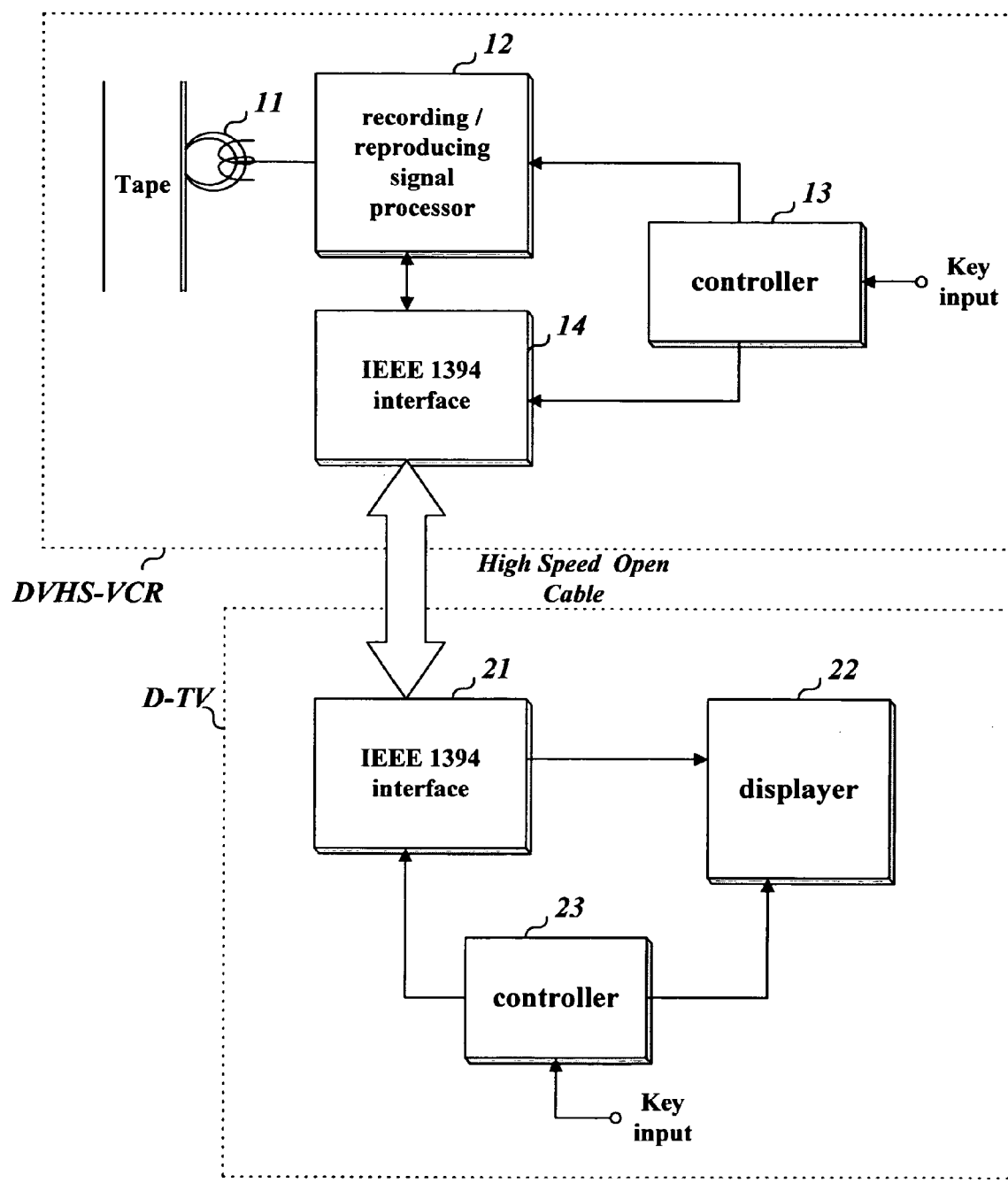
FIG. 1 is a block diagrams of a DVHS-VCR and a D-TV which are connected each other through a digital interface such as a IEEE a 1394.
Figure 2:
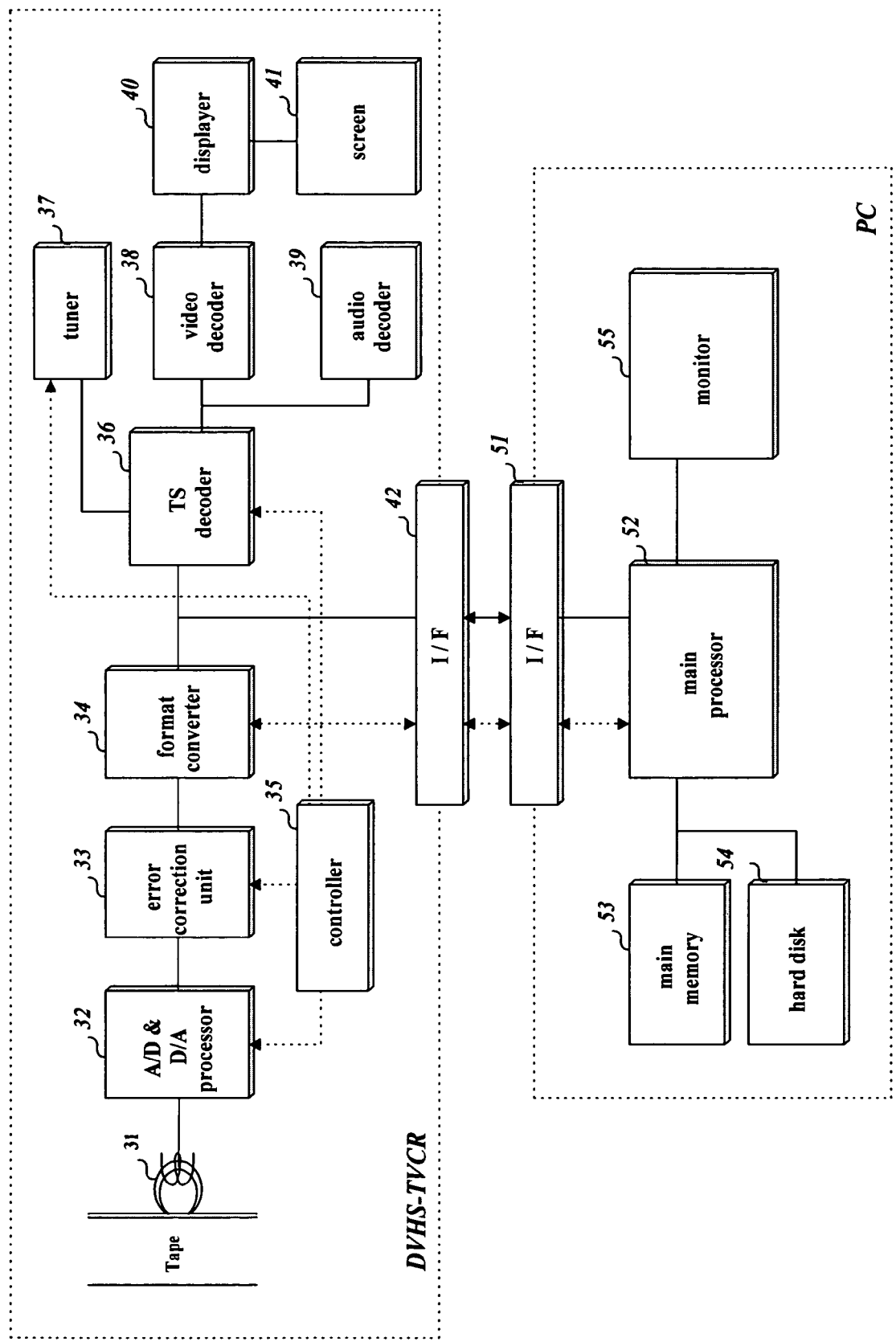
FIG. 2 is a block diagrams of a DVHS-TVCR and a PC depicting the method for storing and retrieving digital data to/from a tape recording medium through a digital interface according to a preferred embodiment of the present invention.

FIG. 2 is a block diagram of a DVHS-TVCR and a PC depicting the method for storing and retrieving digital data to/from a digital video tape through a digital interface according to a preferred embodiment of the present invention. The DVHS-TVCR shown in FIG. 2 is a digital video tape recorder in which a D-TV is integrated.

The DVHS-TVCR comprises heads 31 for recording/reproducing digital video/audio data to/from a DVHS tape; an A/D and D/A processor 32 for converting signals from analog-to-digital or digital-to-analog and processing them to modulate or demodulate; an error correction unit 33 for adding an error correction code (ECC) to input data and correcting the demodulated data having an error; a format converter 34 for converting the data format from internal format to TS format or vice versa; a TS decoder 36 for decoding TS into presentation data; a video decoder 38 for decoding compressed video data of the presentation data into video picture signals; an audio decoder 39 for decoding compressed audio data of the presentation data into real audio signals; a displayer 40 for presenting the video picture signals to a screen 41; a tuner 37 for receiving and tuning digital broadcast signals; a controller 35 for controlling the recording/reproducing and tuning operation; and an interface 42 for sending/receiving data to/from a PC through a digital communication line.

The PC comprises an interface 51 for sending/receiving data to/from the DVHS-TVCR through a digital communication line; a main processor 52 for processing data communicated through the interface unit 51 to store or convert into corresponding video/audio signals, and executing an operating system and application programs; a main memory 53 and a hard disk 54 for storing the processed data and data files; and a monitor 55 for displaying the video signals onto a screen.

In FIG. 2, the PC and the DVHS-TVCR are shown interacting with one another through interface 51 and interface 42. This interaction may be through a physical connection (e.g., cable) between the devices, via an intermediate device between the devices, a wireless link, etc. In short, any means by which signals may be transferred between the interfaces is contemplated for use in the present invention.

The method for storing/retrieving digital data, which are communicated between the DVHS-TVCR and the D-TV through a digital interface, to/from a tape recording medium is described with reference to the accompanying drawings.

Figure 3:
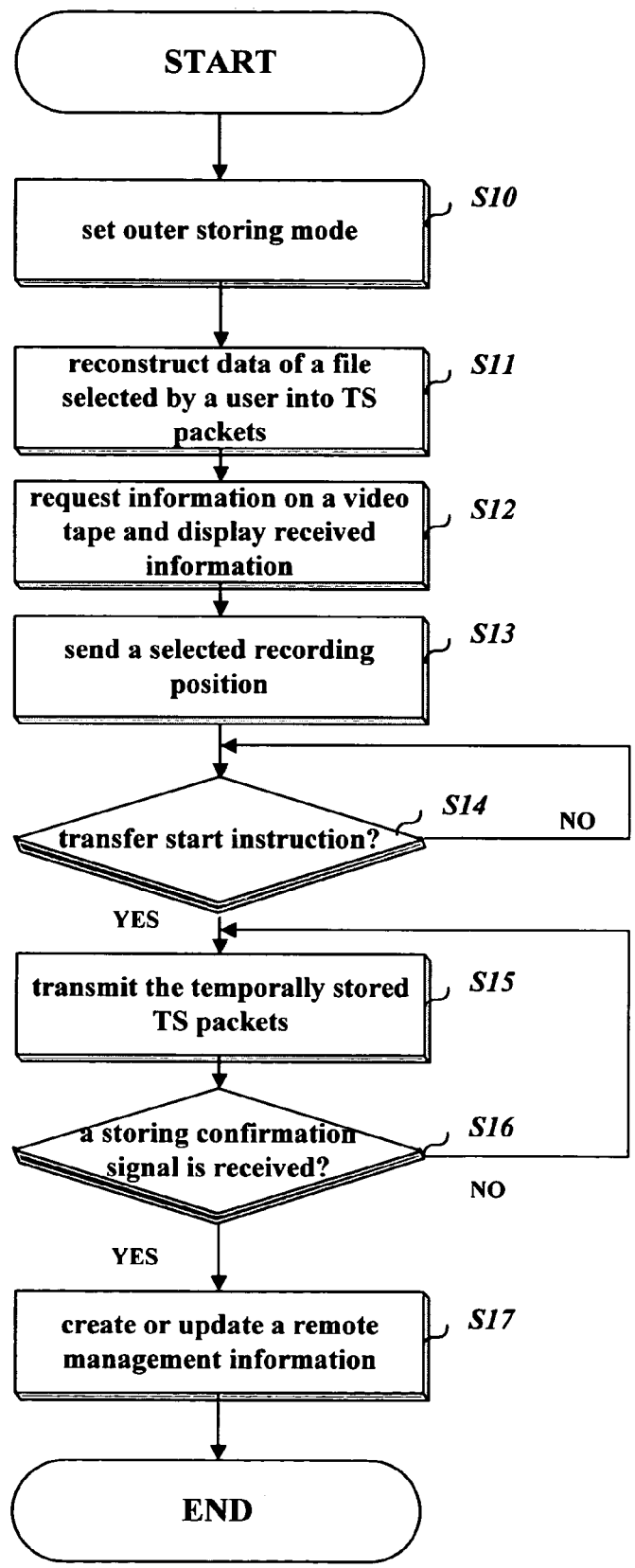
FIG. 3 is a flow diagram of a data storing method of a PC showing a method for storing and retrieving digital data to/from a tape recording medium through a digital interface according to a preferred embodiment of the present invention.
Figure 4:
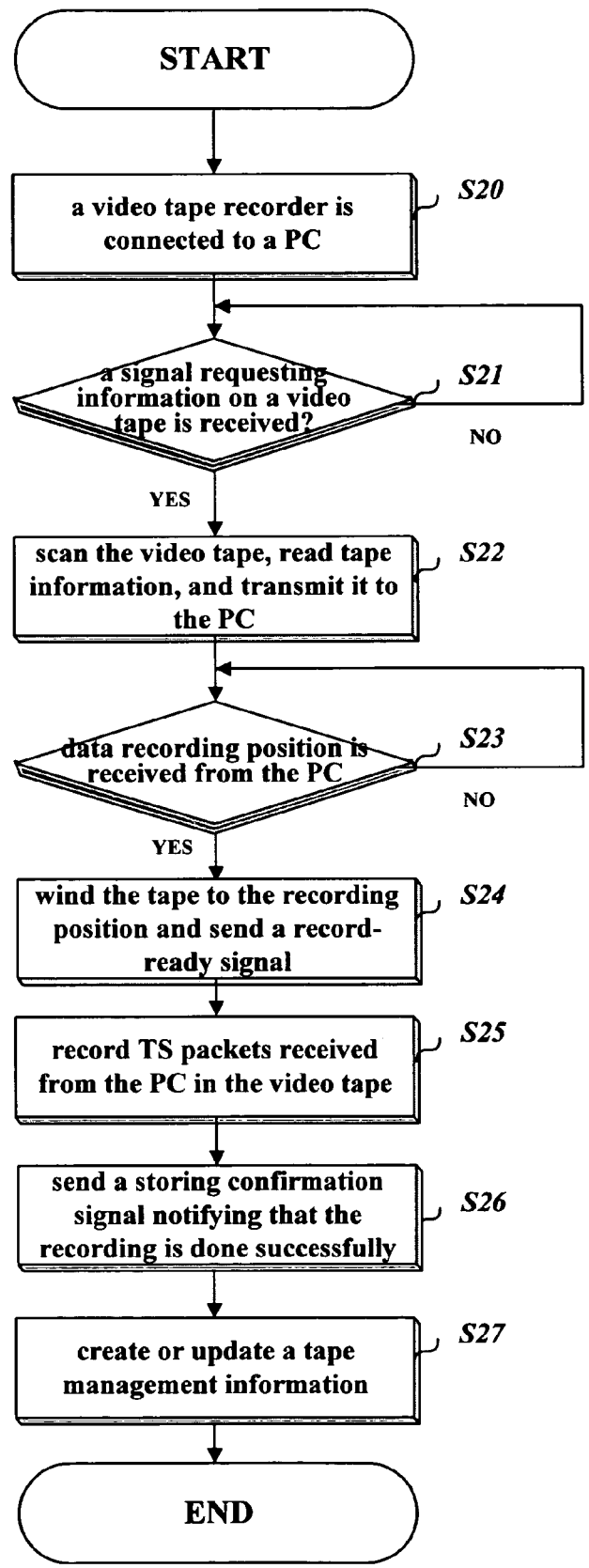
FIG. 4 is a flow diagram of a data storing method of a DVHS-TVCR depicting a method for storing and retrieving digital data to/from a tape recording medium through a digital interface according to a preferred embodiment of the present invention.

FIGS. 3 and 4 are flow diagrams of the data storing method carried out by the PC and the DVHS-TVCR respectively. The flowchart of FIG. 3 is described first.

When an outer storing mode (S10) is set for copying a moving picture data file or a high-quality audio data file to an outer digital video tape inserted in the DVHS-TVCR, the main processor 52 of the PC provides file list on the monitor 55 for a user to select one or more files, reads out data of a selected file from the hard disk 54, reconstructs the read data into packets of TS format (Si 1), and then stores the TS-formatted packets in the main memory 53 temporarily.

At that time, the file information for the selected file, for example, a file name including its directory name, a file size, and a file type are read from the file system such as FAT written in the hard disk 54 and converted into TS packets, then added to the beginning or end of the stored packets of file data.

After that, the main processor 52 receives information on characteristics and recording status of a digital video tape from the DVHS-TVCR through the digital interface 51 after requesting it from the DVHS-TVCR, and displays the received information on the monitor 55 (S12). When a storing position of the video digital tape is selected based on the displayed information by a user, the main processor 52 sends a command for indicating the selected storing position to the VHS-TVCR. The command is transferred to the VHS-TVCR through an asynchronous channel of the IEEE 1394 communication standard.

After the command is sent, if a response signal indicating that the movement to the selected storing position has occurred is received from the DVHS-TVCR and a file transfer-start instruction is entered from a user (S14), the main processor 52 reads out the TS packets stored in the main memory 53 and transmits them to the DVHS-TVCR (S15). Then, the DVHS-TVCR extracts file information TS packets from the received TS packets, and records the TS packets of file data in the digital video tape.

Meanwhile, the PC checks (S16) whether a storing confirmation signal is received from the DVHS-TVCR (S16). The DVHS-TVCR transmits the storing confirmation signal when all the received TS packets are stored with no error. The storing confirmation signal includes the starting and the ending location of the tape section in which the received file data are recorded.

When the file data recording is completed, the DVHS-TVCR records the starting and ending location of the recorded section and the temporarily stored file information, which is extracted from the received TS packets, as a tape management information.

If the storing confirmation signal is received, that is, all the transmitted file data are completely stored in the selected position of the tape, the PC creates or updates (S17) a remote management information for managing the digital video tape and files recorded therein to write the received information on the recording section. The remote management information enables the PC to detect a desirable video tape and to search for a given file.

It is noted that, although the system and method of FIG. 2 are shown using the hard disk and main memory of a PC, the files to be transferred to the D-VHS may instead be stored in a local memory (e.g., RAM, SRAM, Flash Memory, FRAM, etc.) or elsewhere. In this manner, multimedia files being processed by computer (e.g., as they are being accessed from a remote location such as via the Internet) may be recorded onto the D-VHS tape.

Now, the flow chart of FIG. 4 is explained. The DVHS-TVCR communicates with the PC via the IEEE 1394 interface (S20). When a signal requesting the information on the characteristic and recording status of the digital video tape is received from the PC (S21), the DVHS-TVCR scans the tracks, reads information on the characteristic and recording status from the tape management information, and then transmits (S22) the read information through the interface 42.

After that, when the aforementioned command for indicating the data recording position of the digital video tape is received (S23) from the PC, the DVHS-TVCR winds the tape until the heads 31 are located on the data recording position. When the tape winding is completed, the DVHS-TVCR sends the aforementioned response signal to the PC (S24), so that the PC becomes aware that the DVHS-TVCR can accept data, and starts to send the TS packets temporarily stored in the main memory 53.

Accordingly, the DVHS-TVCR receives the TS packets transmitted from the PC and records them in the video tape (S25). Also, the DVHS-TVCR transmits the aforementioned storing confirmation signal to the PC if recording is completed successfully (S26), and creates or updates the tape management information to write information on the just-stored file data (S27). The DVHS-TVCR is able to search for a given file using the tape management information.

Figure 5:
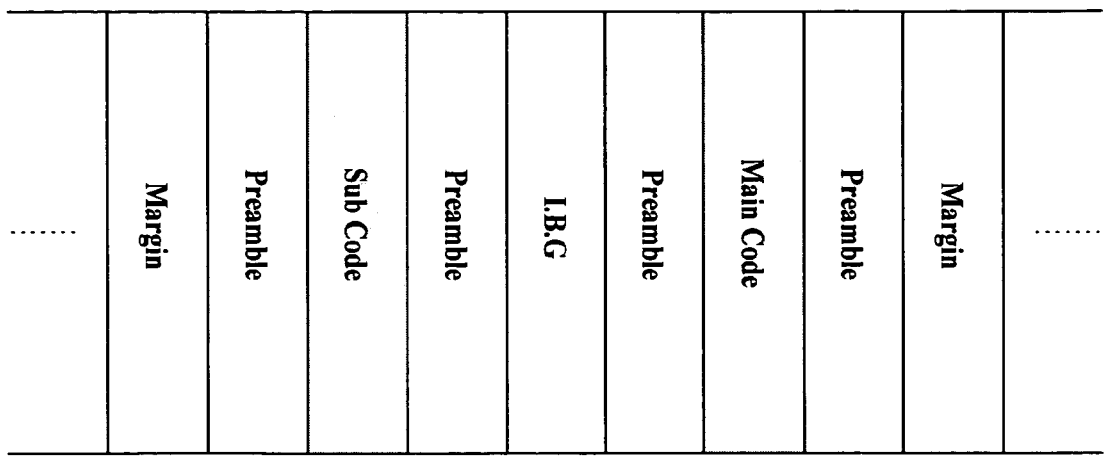
FIG. 5 shows an example of a data track format of a digital video tape in which digital data are recorded.

FIG. 5 shows an example of a data track format of a digital video tape in which digital data are recorded. The main code is a collection of main code sync blocks, and the subcode is a collection of subcode sync blocks. Each main code sync block has a sync, an identification (ID), and a main data area composed of packs, and inner parity. Each subcode sync block has a sync, ID, and a sub data area composed of packs, and inner parity. The TS packets received from the PC are recorded in the packs, and it is desirable that the tape management information for the PC files is repeatedly recorded in the packs of a sub data area every subcode sync block for rapid detection.

Figure 6:
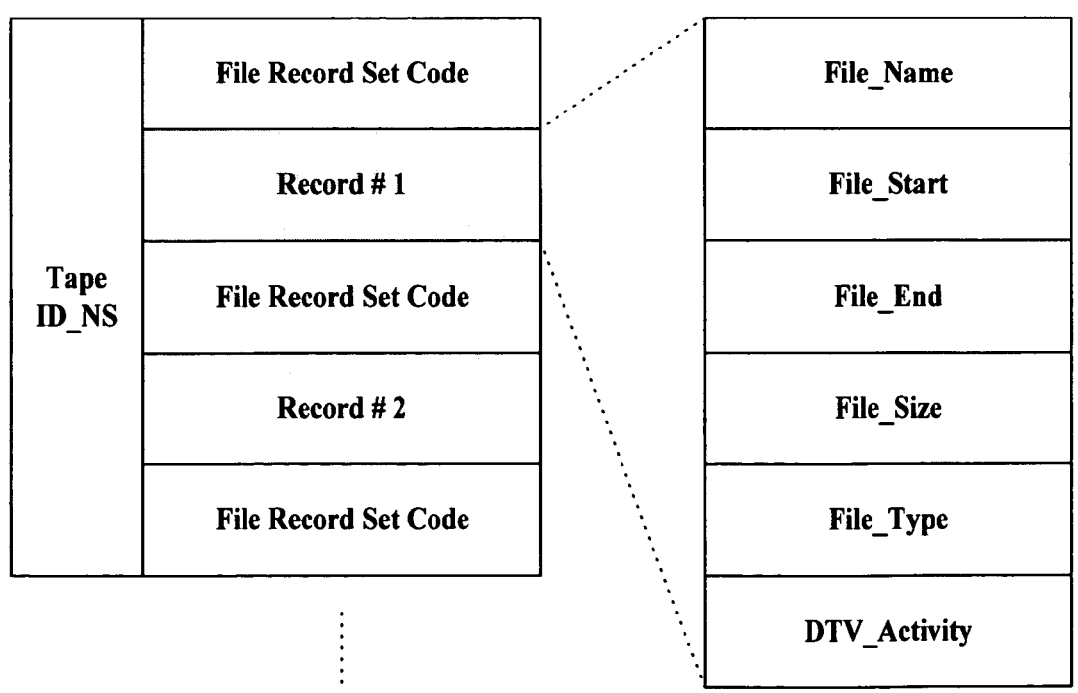
FIG. 6 shows a file information table created after storing data to another recording device according to the present invention.

The PC creates the aforementioned remote management information to manage the files stored in an external recorder after requesting the external device to store file data. FIG. 6 shows an example of the remote management information which includes a tape identification number 'Tape_ID_NS' for identifying a video tape with PC files, several file record set codes, and record items. Each record item has the fields of a file name 'File_Name', a file start position 'File_Start', a file end position 'File_End', the size 'File_Size', a file type 'File_Type', and 'DTV_Activity' to indicate whether the file data are able to be displayed directly in the digital television.

The code value of a corresponding file record set is transmitted to the DVHS-TVCR at the same time when the file information is transferred.

Figure 7:
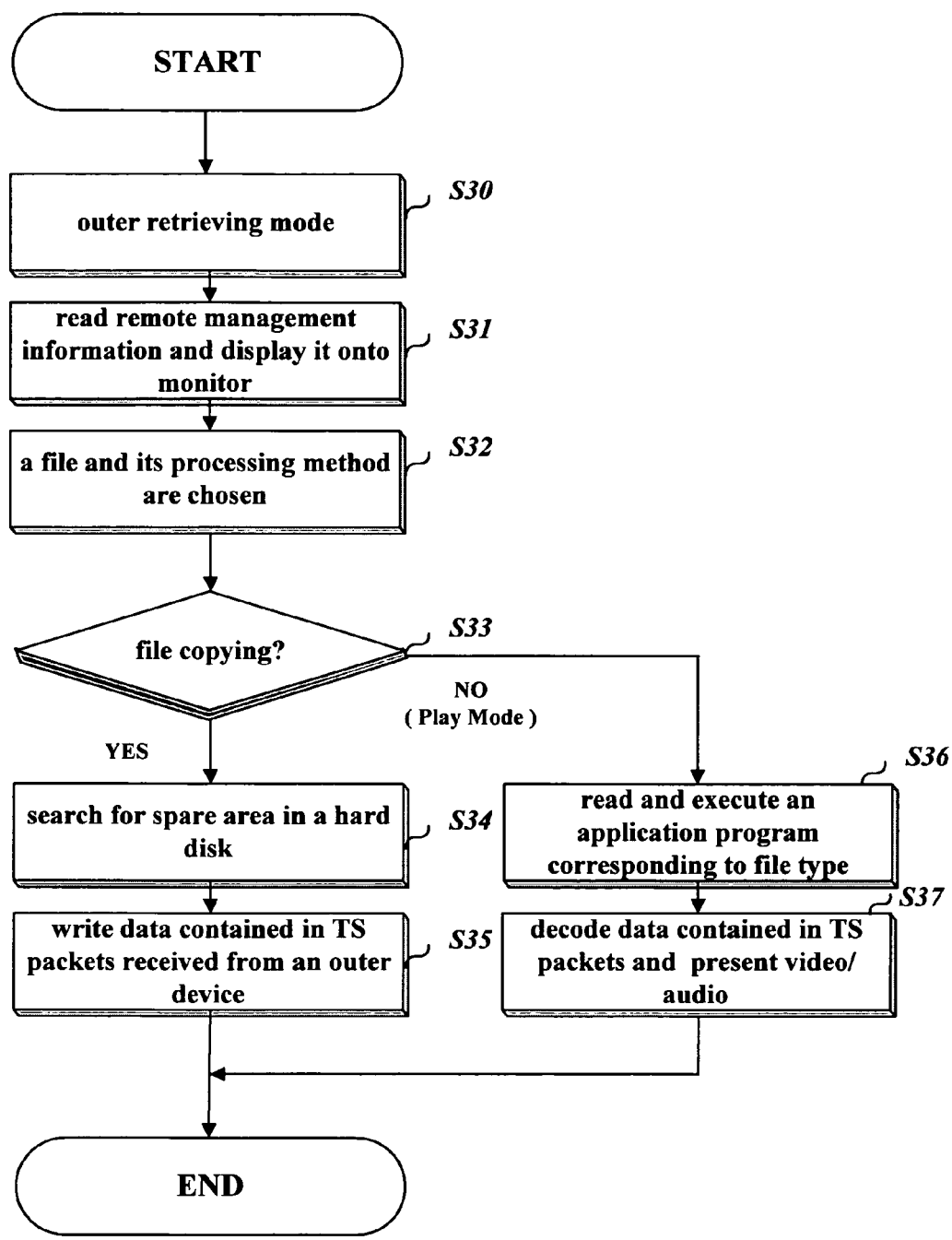
FIG. 7 is a flow diagram of a data retrieving method of a PC showing a method for storing and retrieving digital data to/from a tape recording medium through a digital interface according to one embodiment of the present invention.
Figure 8:
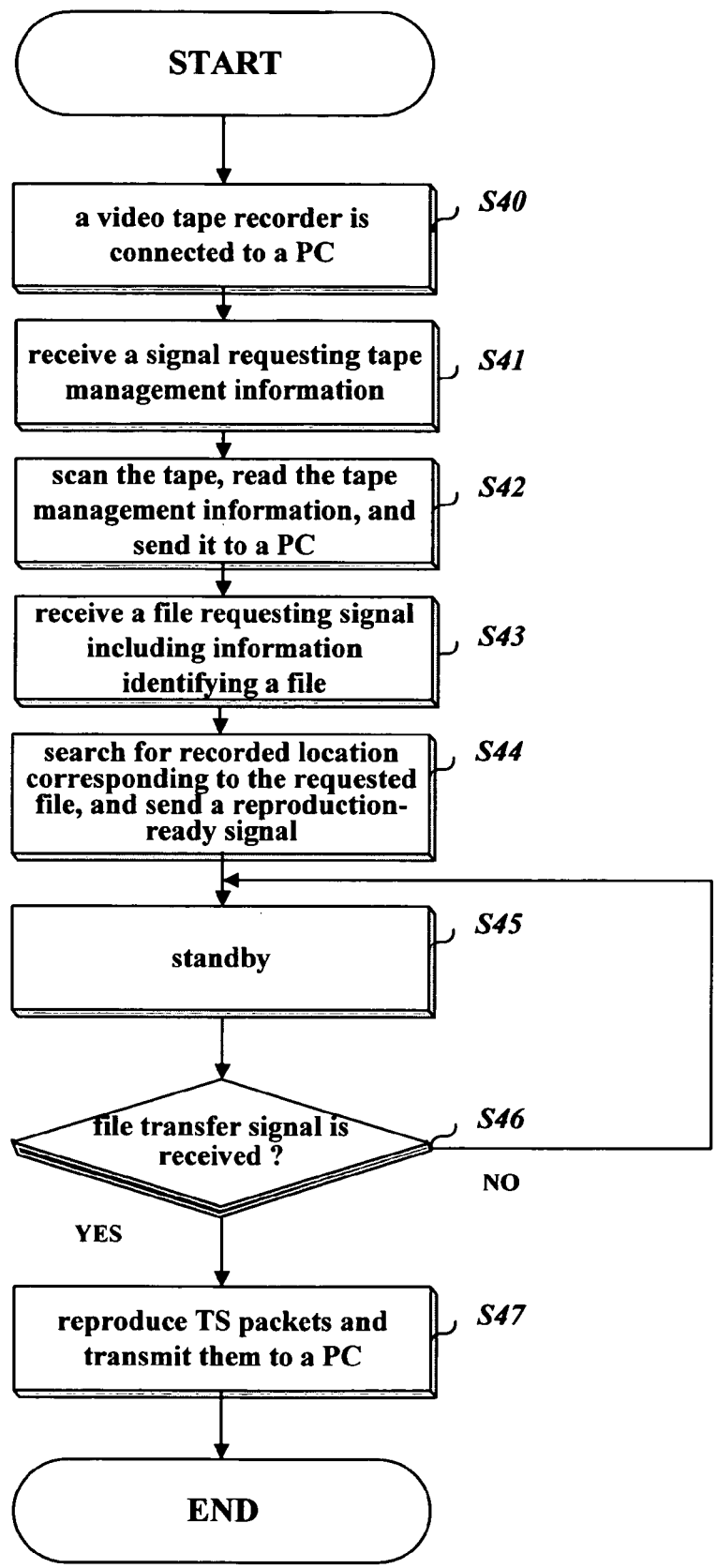
FIG. 8 is a flow diagram of a data retrieving method of a DVHS-TVCR depicting a method for storing and retrieving digital data to/from a tape recording medium through a digital interface according to one embodiment of the present invention.

FIGS. 7 and 8 are flow diagrams of the data retrieving method carried out by the PC and the DVHS-TVCR respectively. The flowchart of FIG. 7 is explained first. When the operating mode of the PC is set to the outer retrieving mode (S30) for reading out a moving picture data file or a high-quality audio data file from an outer digital video tape inserted in the external DVHS-TVCR which communicates with the PC through the digital interface, the remote management information as in FIG. 6 stored in the hard disk 54 is read out and then displayed onto the monitor 55 (S31). After that, if a file is selected, the main processor 52 asks the user to determine whether the selected file is to be copied onto the hard disk 54 or to be reproduced directly, and receives a user's choice (S32).

Instead of reading out the remote management information of FIG. 6 from the hard disk 54, it is possible to request the tape management information recorded in the video tape inserted in the DVHS-TVCR and display it onto the monitor 55 if it is received.

If the user's choice is to copy the selected file onto the hard disk 54, the main processor 52 searches (S34) for a blank area of the hard disk 54 for storing the data transferred from the DVHS-TVCR. If there is a blank area, the main processor 52 sends a file requesting signal including the file name and file record set code to the DVHS-TVCR. According to the file requesting signal, if the DVHS-TVCR sends TS packets belonging to the selected file, the main processor 52 receives them and stores data contained in them in the blank area.

Instead of offering a file name to the DVHS-TVCR when sending the file requesting signal, it is possible to offer the starting and the ending location of the selected file which are written in the remote management information in order that the DVHS-TVCR may specify a file among files recorded in the video tape.

After the received file data is stored onto the hard disk 54, the main processor 52 updates the file information of the hard disk 54. Meanwhile, if the user's choice is not file copy but file reproduction, the main processor 52 reads and executes (S36) a decoding program corresponding to the type of the selected file. The decoding program decodes the data contained in the TS packets from the DVHS-TVCR and then outputs decoded moving pictures on the monitor 55 (S37).

Now, the flowchart of FIG. 8 is explained. The DVHS-TVCR communicates with the PC via the IEEE 1394 interface (S40). When a signal requesting information on the characteristic and recording status of the digital video tape is received from the PC (S41), the DVHS-TVCR scans the tracks, reads tape management information recorded repeatedly on the video tape, and then transmits the read information to the PC (S42). After that, if the file requesting signal is received from the PC (S43), the DVHS-TVCR searches for the data location of the requested file based upon the received file name and the tape management information.

When the data location is found, the DVHS-TVCR sends a reproduction-ready signal (S44) to the PC and enters a standby mode (S45). In the standby mode, when a file transfer signal is received (S46) from the PC, the DVHS-TVCR reproduces the recorded signals from the data location on the video tape, restores the reproduced signals into TS packets, and transmits them to the PC (S47).

According to the above-explained cooperation between the PC and the DVHS-TVCR which communicate with each other through a digital interface, moving picture data such as MOV, MPEG, and RA type or high-quality music data files such as MP3 type are stored or retrieved to/from an outer digital video tape of mass storage.

The method for storing and retrieving digital data of a PC to/from a tape recording medium of a video tape recorder through a digital interface enables a digital video tape of mass storage, whose price is much lower than a hard disk, to be used as an auxiliary storage device of a PC via a digital communication line, thereby satisfying the increasing need for larger storage capacity for multimedia files.

Although the invention has been described with respect to the memory of a personal computer (local memory or hard drive) it is understood that the present invention applies to any type of file storage, local or remote, which can be processed through a computer and, via the digital interface, recorded on a D-VHS tape. In this manner, files stored remotely may be accessed by a local PC. The term "storage device" thus includes any type of PC memory as well as devices storing multimedia files.

Also, it is noted that the digital interface embodied by the IEEE 1394 standard is an exemplary digital interface. Any digital interface which allows interaction between a storage device and a D-VHS recording medium is contemplated for use in the present invention.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for storing digital data from a storage device to a digital recording medium, comprising:
   (a) searching for a recordable location in the digital recording medium when a data store is requested from said storage device in communication with the digital recording medium through a digital interface, wherein said storage device includes a microprocessor and a memory;
   (b) recording data streams received through the digital interface from said memory of said storage device in the location discovered in (a), wherein the data streams have been converted from the data of a multimedia file which is selected in said storage device; and
   (c) creating management information regarding the data streams recorded, further comprising:
      providing a list of multimedia files from the microprocessor for selection by a user,
      reading data of a selected multimedia file from a computer readable storage medium by the microprocessor,
      converting the read data into packets of transport stream (TS) format, and
      storing the TS-formatted packets in the memory, and wherein (b) and (c) record the received data in a main code area and the management information in a subcode area of the recording medium.

2. A method set forth in claim 1, further comprising transmitting information on the characteristics and recording status of the recording medium to the microprocessor of the storage device before the process recited in (a).

3. A method set forth in claim 1, wherein the data streams are transport streams of MPEG format.

4. A method set forth in claim 1, wherein the management information is repeatedly recorded in the recording medium.

5. A method set forth in claim 1, wherein the management information includes file information received together with the data streams from said storage device.

6. A method set forth in claim 1, wherein the management information includes information on the section of the recording medium in which the received data streams are recorded.

7. The method of claim 1, wherein the computer readable storage medium is the Internet.

8. A method for retrieving digital data from a digital recording medium and sending the reproduced data to a storage device through a digital interface, comprising:
   (a) reproducing management information recorded in the digital recording medium when a retrieving request for a given multimedia file is received from a microprocessor of said storage device;
   (b) identifying a recording location of the given multimedia file based upon the reproduced management information;
   (c) searching for the identified location in the digital recording medium and reproducing recorded data from the identified location;
   (d) converting the reproduced data into transport streams (TS) and transmitting the TS data to the microprocessor of said storage device; and
   (e) storing the transmitted TS data in a memory of said storage device, further comprising:
      reproducing the tape recording medium according to a request of information on recorded files, detecting management information on the recorded files, and transmitting the detected information to said storage device before said step (a), wherein the microprocessor of the storage device stores the TS data in a computer readable storage medium of the storage device as a file, and wherein said step (a) obtains the management information on recorded files by reproducing a sub-code area of the recording medium in which data are recorded in a prescribed standard.

9. A method set forth in claim 8, wherein the microprocessor of the storage device decodes the TS data to present video and/or audio.

10. A method set forth in claim 8, wherein the retrieving request includes a file name of the given file and an identification code of file set to which the given file belongs.

11. A method set forth in claim 8, wherein the retrieving request includes a file name and a directory name of the given file.

12. The method of claim 8, wherein the prescribed standard is a DVHS standard.

* * * * *